(12) United States Patent
Fietz et al.

(10) Patent No.: US 9,856,916 B2
(45) Date of Patent: Jan. 2, 2018

(54) SEAL, METHOD FOR PRODUCING SAME AND SEALING ARRANGEMENT THEREWITH

(71) Applicant: CARL FREUDENBERG KG, Weinheim (DE)

(72) Inventors: Roland Fietz, Neustadt-Momberg (DE); Andreas Palmer, Erwitte (DE)

(73) Assignee: CARL FREUDENBERG KG, Weinheim (DE)

( * ) Notice: Subject to any disclaimer, the term of this patent is extended or adjusted under 35 U.S.C. 154(b) by 22 days.

(21) Appl. No.: 14/650,873

(22) PCT Filed: Dec. 4, 2013

(86) PCT No.: PCT/EP2013/003653
§ 371 (c)(1),
(2) Date: Jun. 10, 2015

(87) PCT Pub. No.: WO2014/090380
PCT Pub. Date: Jun. 19, 2014

(65) Prior Publication Data
US 2015/0316152 A1    Nov. 5, 2015

(30) Foreign Application Priority Data
Dec. 11, 2012  (DE) .......... 10 2012 024 120

(51) Int. Cl.
| | | |
|---|---|---|
| F16J 15/32 | (2016.01) |
| F16C 33/78 | (2006.01) |
| F16J 15/3232 | (2016.01) |
| F16J 15/328 | (2016.01) |
| F16J 15/34 | (2006.01) |
| F16C 29/08 | (2006.01) |

(52) U.S. Cl.
CPC .......... *F16C 33/783* (2013.01); *F16C 29/088* (2013.01); *F16C 33/7853* (2013.01); *F16C 33/7863* (2013.01); *F16C 33/7886* (2013.01); *F16J 15/328* (2013.01); *F16J 15/3232* (2013.01); *F16J 15/3456* (2013.01); *F16C 2226/36* (2013.01); *F16C 2300/14* (2013.01)

(58) Field of Classification Search
CPC .... F16J 15/3232; F16J 15/328; F16J 15/3456; F16C 33/783; F16C 33/7853; F16C 2226/36; F16C 2300/14; F16C 33/7886; F16C 29/088
USPC ................ 277/566, 382, 395, 530
See application file for complete search history.

(56) References Cited

U.S. PATENT DOCUMENTS

| | | |
|---|---|---|
| 2,177,441 A | 10/1939 | Pesarese |
| 3,761,099 A | 9/1973 | Hansson |
| 3,768,819 A | 10/1973 | Burkert |
| 6,468,656 B1 | 10/2002 | Beha |
| 2009/0014963 A1* | 1/2009 | Fietz ...................... F16J 15/025 277/402 |

(Continued)

FOREIGN PATENT DOCUMENTS

| | | | |
|---|---|---|---|
| DE | 202010013917 U1 | 1/2012 | |
| DE | 102010034033 | * 2/2012 | .......... F16C 33/7836 |

(Continued)

*Primary Examiner* — Nathan Cumar
(74) *Attorney, Agent, or Firm* — Leydig, Voigt & Mayer, Ltd.

(57) ABSTRACT

A seal having a substantially H-shaped sealing profile.

17 Claims, 7 Drawing Sheets

(56) References Cited

U.S. PATENT DOCUMENTS

| | | | |
|---|---|---|---|
| 2011/0019949 A1* | 1/2011 | Akita | E02F 9/006 |
| | | | 384/147 |
| 2011/0103728 A1* | 5/2011 | Cowles | F16C 19/163 |
| | | | 384/484 |
| 2011/0249926 A1 | 10/2011 | Gruber et al. | |

FOREIGN PATENT DOCUMENTS

| | | |
|---|---|---|
| JP | 56947 U | 1/1981 |
| JP | 631866 A | 1/1988 |
| JP | 2000167943 A | 6/2000 |
| WO | WO 2010043248 A1 | 4/2010 |
| WO | WO 2011050837 A1 | 5/2011 |

* cited by examiner

SEAL, METHOD FOR PRODUCING SAME AND SEALING ARRANGEMENT THEREWITH

CROSS-REFERENCE TO RELATED APPLICATIONS

This application is a U.S. national stage application under 35 U.S.C. §371 of International Application No. PCT/EP2013/003653, filed on Dec. 4, 2013, and claims benefit to German Patent Application No. DE 10 2012 024 120.8, filed on Dec. 11, 2012. The International Application was published in German on Jun. 19, 2014, as WO 2014/090380 A1 under PCT Article 21(2).

FIELD

The invention relates to a seal, to a method for the production of said seal and to a sealing arrangement which includes the seal.

BACKGROUND

Seals are known in general and are used, for example, for sealing rotary or translationally movable machine elements. The machine elements which are sealed can be, for example, shafts, rods, spindles or roller bearings. Liquid or paste-like media are frequently sealed in relation to the surrounding area, or, by means of seals, contaminants from the surrounding area of the machine elements, such as, for example, dirt, dust, salt and/or moisture, are kept away from the interior of the machine elements in which the seals are arranged.

The seals can be realized as sealing rings and, depending on the application, can comprise variously-sized diameters.

In particular seals which seal a diameter of more than 400 mm, have an expensive design and are consequently complicated and costly to produce. In the majority of cases, such seals consist of several parts, such as, for example, a supporting body produced from a metal material which is connected to a sealing element produced from an elastomer material.

SUMMARY

An aspect of the invention provides a seal having a substantially H-shaped sealing profile.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
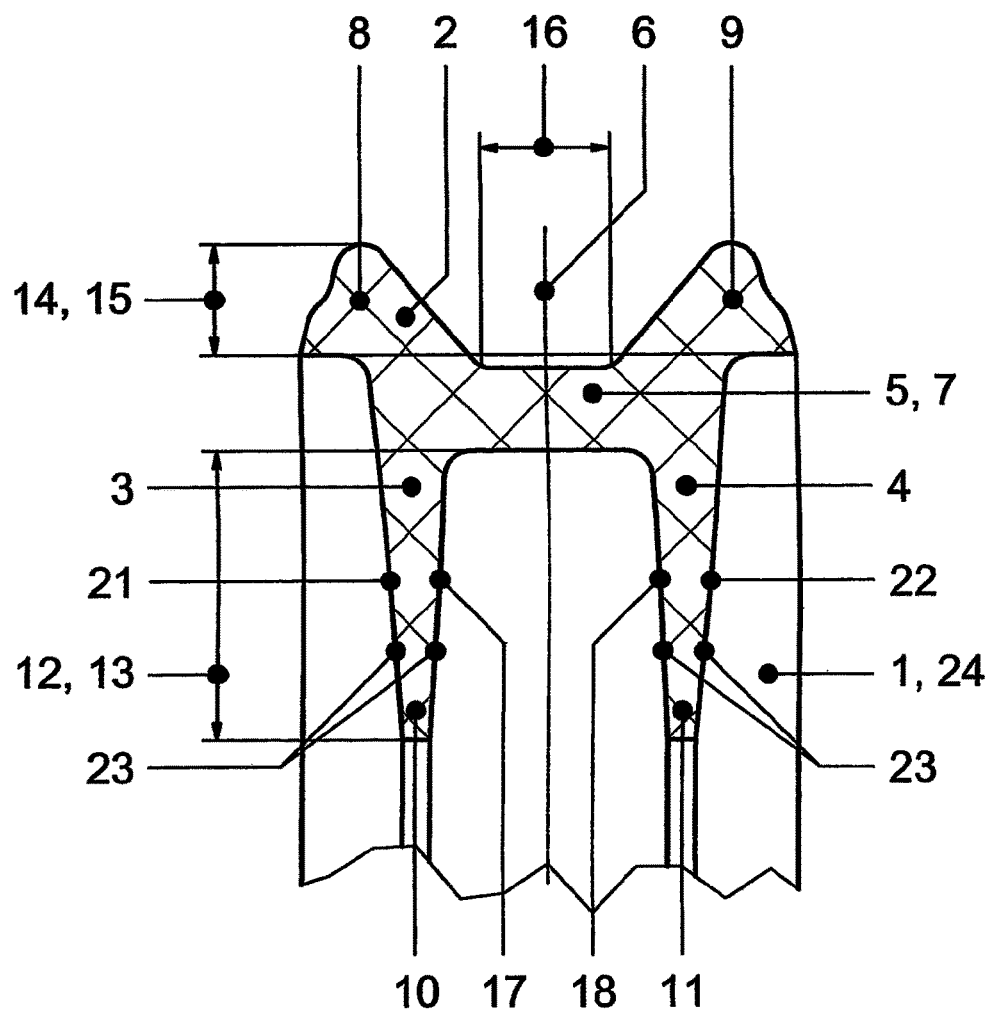
FIG. 1 shows a seal which is realized as a sealing ring and a substantially H-shaped sealing profile.

An aspect of the invention is to develop further a seal of the type mentioned in the introduction such that it comprises a simple design with a small number of parts, is cost-efficient to produce and can be assembled in a simple manner, in particular when the seal comprises a very large diameter, for example of several meters.

An aspect of the invention provides a seal, a method for producing said seal and a sealing arrangement with the features of the independent claims.

An aspect of the invention provides a seal including a substantially H-shaped sealing profile.

An H-shaped sealing profile is simple and cost-efficient to produce and can be assembled in a simple manner.

The substantially H-shaped sealing profile, when viewed in cross section, includes two longitudinal webs which are arranged adjacent one another, spaced apart from one another and are connected together by a cross web.

It can be provided in a preferred manner that the sealing profile is realized symmetrically with respect to an imaginary plane which, when viewed in cross section, is arranged centrally of the cross web. Such a symmetrical development is particularly simple to assemble because each of the two longitudinal webs comprises the identical performance characteristics and the direction in which the sealing profile is installed consequently plays no role in the operation of the seal. The risk of assembly errors is reduced to a minimum as a result.

The cross web is realized as a pivot joint about which the longitudinal webs are pivotable in a clothes-peg-like manner relative to one another. For assembling the seal, the longitudinal webs are pivoted about the pivot joint away from one another on one side of the pivot joint so that the longitudinal webs on the other side of the pivot joint are moved in a corresponding manner toward one another. Said ends of the longitudinal webs which are moved toward one another can then be inserted into an installation groove of a machine element, the seal being locked in the installation groove as a result of the sealing profile, following its assembly in the installation groove, reverting automatically into its production-related H-shaped form. The sealing profile is secured in the installation groove as a result of the longitudinal webs, which are arranged in the installation groove, spreading apart.

The longitudinal webs, in each case proceeding from the cross web, can comprise a peg arm on the one side and a sealing lip on the other side.

The seal, as described beforehand, is secured in the installation groove of a machine element by means of the peg arms. The sealing lips seal said machine element, in which the seal is secured, in relation to another machine element.

The ratio between the length of the sealing lips and the length of the corresponding peg arms of the respective longitudinal webs, in each case proceeding from the cross web, is at least two. It is advantageous in this respect for the peg arms to be realized, with reference to the corresponding sealing lips of the longitudinal webs, in a compact and thereby dimensionally stable manner. As a result of said dimensionally stable realization of the peg arms, the seal can be connected in a particularly precise fitting manner to a machine element. Even if the seal is exposed to forces from the surrounding area during its intended use, the precisely fitting association between the seal and the machine element is constantly maintained as a result of the high degree of dimensional stability.

On the other hand, the sealing lips comprise a greater flexibility so as to be able to be better placed onto the surface of the machine element to be sealed. The elastic flexibility of the sealing lips makes it easily possible to compensate for manufacturing tolerances of the machine elements, between which the seal is used. The seal then comprises good performance characteristics over a long service life.

According to an advantageous development, it can be provided that the peg arms are realized in the shape of a latching lug. In the region of their free ends, the peg arms can engage behind an undercut in the installation groove of the machine element, on which the seal is secured, so as to produce a positive locking fit. The latching lugs of the peg arms additionally operate as a static seal for sealing the installation groove.

The seal can be snapped into the installation groove as a result of the latching-lug-shaped free ends of the peg arms.

In a preferred manner, the ratio between the length of the sealing lips and the flexibly effective width of the cross web is between 0.75 and 1.5. Such a ratio ensures that the peg arms are able to be pivoted far enough toward one another when the cross web is deformed in order to be able to engage in a positive locking manner in the installation groove of the machine element.

By means of their flanks which face one another, the sealing lips can delimit a lubricant reservoir which is filled with a lubricant when the seal is used as intended. The abrasive wear of the dynamically stressed sealing lips is reduced to a minimum as a result of the lubricant in the lubricant reservoir and, in addition, a barrier is formed between the two sealing lips which prevents contaminants from the surrounding area penetrating into the space to be sealed.

The flanks which face one another and/or the flanks which are remote from one another of the sealing lips can comprise a surface profiling. The surface profiling can be formed, for example, by a light grooving which forms additional micro lubricant deposits. The lubricant situated in the micro lubricant deposits, in this case, reduces the friction between the sealing lips and the machine element which is movable with respect to said sealing lips and is to be sealed.

In a preferred manner, all the flanks of the sealing lips are provided with such a surface profiling.

The seal is realized in a preferred manner in one material, consists of a material with elastomer characteristics and has a Shore hardness A of between 70 and 95. Such a seal comprises a satisfactorily high degree of dimensional stability even without separately created supporting bodies.

The material can be formed by a polyurethane. Such materials comprise a comparatively low coefficient of friction. When the seal is used as intended, the development of heat in the region of the sealing points between the sealing lips and the machine element to be sealed is reduced as a result.

Disadvantageous, temperature-related effects on the medium to be sealed are excluded as a result.

A further reduction in the frictional torque and an improvement in the emergency and dry-run characteristics can be achieved as a result of the material including friction-reducing fillers. Such friction-reducing fillers can be formed, for example, by PTFE particles.

The seal can be realized, for example, as a sealing ring. Such a sealing ring can seal, for example, a shaft in relation to a housing, the shaft penetrating the housing.

In addition, the invention relates to a method for producing a seal, as described beforehand, where an endless belt-shaped sealing profile is extruded in a first method step and in a second method step is cut to length, where the cut-to-length sealing profile is deformed in a ring-shaped manner in a third method step and where the two free ends of the sealing profile which is formed into the sealing ring are connected together in a fourth method step.

To produce the seal in a cost-efficient manner, in the first method step the extrusion method has been chosen. Very dimensionally stable, low-tolerance profiles can be created as a result of such a method, and over and above this, it is possible, for example, to bring the peg arms into their ready-to-use form as a result of cutting operations. Very sharp-edged sealing edges can be realized as a result of such cutting operations.

The sealing profile is formed into a sealing ring with a diameter 400 mm in the third method step. In particular, the extrusion method described beforehand is particularly well suited for producing sealing rings with a large diameter. Other methods for producing sealing rings with large diameters, it being perfectly possible for large diameters to be diameters of between 2 m and 4 m, or even larger, are expensive and costly in time and money to execute. Previously known seals produced according to other manufacturing methods can consist of several parts and include supporting bodies and/or coil springs, joining said parts together being time-consuming and costly.

The seal according to the invention, in contrast, comes without additional elements, such as, for example supporting bodies and/or coil springs and is realized overall in one piece and from one material. Once the seal has been assembled in a simple manner between the machine elements to be sealed with respect to one another, the seal comprises a secure seat.

In the case of a sealing ring with a large diameter of, for example, approximately 4 m, as a result of the method according to the invention and of the seal according to the invention, large amounts of steel for unnecessary supporting bodies and components can be saved and consequently, in the case of rotating seals, the effectiveness of a system can be improved. In addition, the efficiency of the tools for producing the seal can be increased as a result of less mass having to be moved. The greater the diameter of the seal, the greater the previously named advantages.

The two free ends can be welded together in the fourth method step.

In a preferred manner, mirror welding is used for welding the free ends together. Mirror welding is also called heated-tool butt welding and serves for the purpose of connecting plastics material components together. As a result of supplying heat by means of a heating element, the components to be joined together are moved into a thermoplastic state in the region of their joints and are then joined together under pressure.

As a result of extruding endless profiles and the subsequent production of a sealing ring, sealing rings with a virtually unlimited size of diameter can be created, the advantage of the described welding method being that joints are able to be created therewith, with a homogeneous material at the joint, that is at the free ends. The joints do not comprise material brought in as a result of the joining process. This makes it possible for the original material to have a high level of durability and resistance against temperature fluctuations and chemical influences at the seam between the two free ends.

In addition, it is advantageous that the third and the fourth method step can be performed where necessary "on site", for example at the site of construction. As a result, it is advantageous that the initially endless, belt-shaped sealing profiles which are cut to length are able to be transported in a comparatively problem-free manner. Transport can be effected in cardboard boxes by means of normal parcel shipping.

In addition, the invention relates to a sealing arrangement, including a seal, as described beforehand and at least two machine elements, wherein the seal is arranged with its peg arms in each case in a positive locking manner in an installation groove of the one machine element and contacts the installation groove with its peg arms in a substantially statically sealing manner and contacts the other machine element with the sealing lips in a dynamically sealing manner. The machine elements can be formed by bearing shells of a large diameter roller bearing. These types of large diameter roller bearings can be used in wind turbines, it being perfectly possible for the diameter of seals which are used for this purpose to be approximately 4 m and more.

The one machine element can be formed by a housing with a bore, the other machine element by a shaft which is surrounded by the housing at a radial spacing, the seal, which surrounds the shaft in a dynamically sealing manner by way of its sealing lips, being arranged in the gap formed by the spacing.

One exemplary embodiment each of the stressed seal and of the sealing arrangement which includes the seal are explained in more detail below by way of the figures.

FIG. 1 shows an exemplary embodiment of the seal 1 according to the invention which comprises an H-shaped sealing profile 2. The seal 1 is realized as a sealing ring 24 and, when viewed in the cross section shown in this case, includes two longitudinal webs 3, 4 which are arranged adjacent one another and at a spacing from one another. The two longitudinal webs 3, 4 are connected together by the cross web 5 and are realized in a symmetrical manner with respect to an imaginary plane 6 which, when viewed in cross section, is arranged centrally of the cross web 5.

The cross web 5 is realized as a pivot joint 7 so as to be able to mount the seal. The mounting of such a seal 1 is explained in more detail subsequently by way of FIGS. 4 to 7.

The decisive factor is that the seal 1 is realized overall in one piece and in one material and consists of a material with elastomer characteristics. In the exemplary embodiment shown, the material making up the seal 1 is polyurethane with a Shore hardness A of between 70 and 95.

Each longitudinal web 3, 4 includes a peg arm 8, 9 and a sealing lip 10, 11. The peg arm 8 and the sealing lip 10 of the longitudinal web 3 and the peg arm 9 and the sealing lip 11 of the longitudinal web 4 are connected together by the cross web 5, the sealing lips 10, 11 comprising a length 12, 13 which is greater by at least the factor 2 than the length 14, 15 of the corresponding peg arms 8, 9 of the respective longitudinal webs 3, 4. In the exemplary embodiment shown, the flanks 17, 18, which face one another, of the sealing lips 10, 11 and the flanks 21, 22, which are remote from one another, of the sealing lips 10, 11 are provided with a surface profiling 23, the surface profiling forming micro deposits of lubricant. Together with the polyurethane material which comprises a comparatively low coefficient of friction, the lubricant arranged in the profiling brings about a further reduction in the frictional torque and, as a result, improves the emergency and dry-run characteristics of the seal 1.

Figure 2:
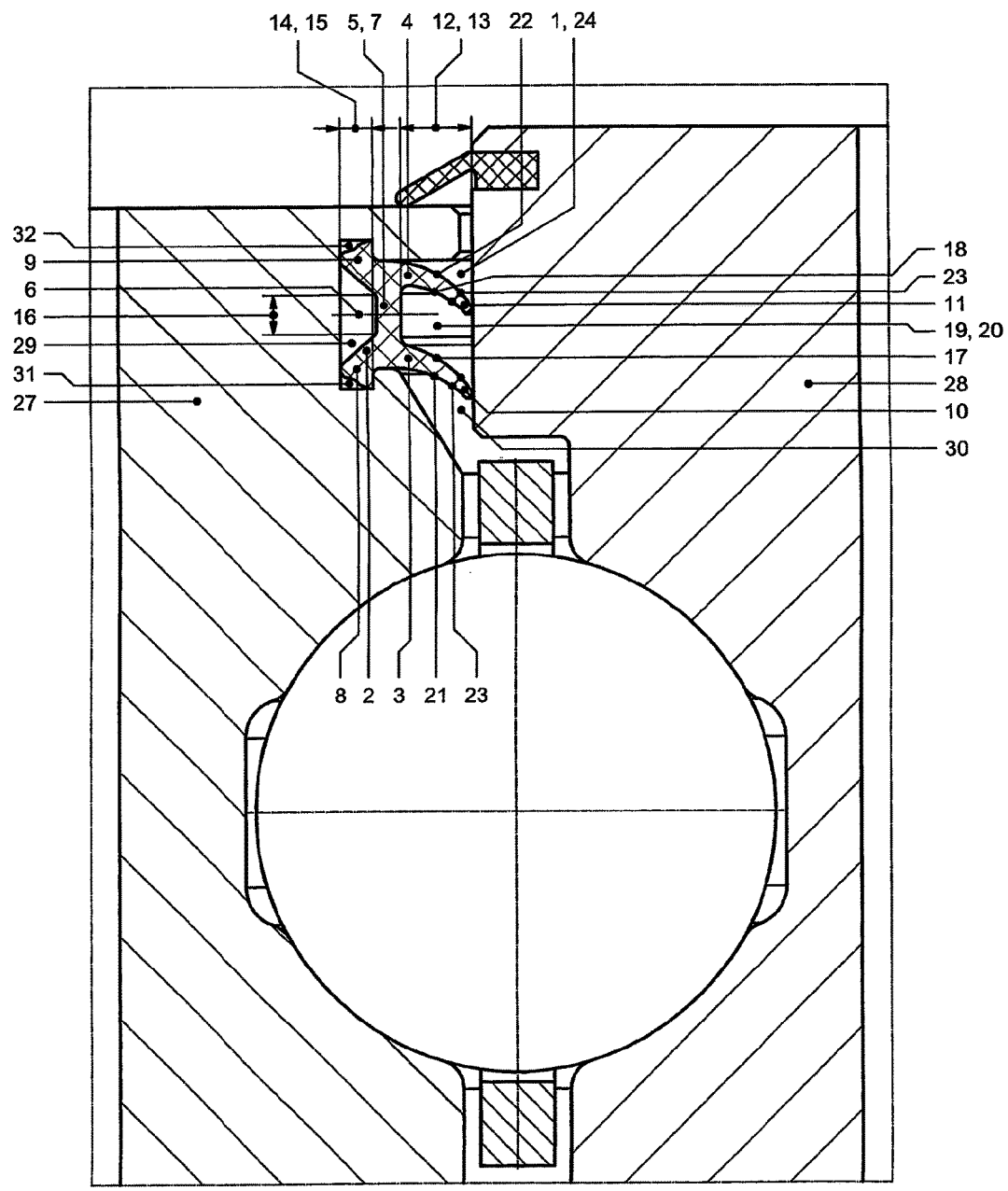
FIG. 2 shows the seal from FIG. 1, installed in a sealing arrangement, the two machine elements to be sealed with respect to one another being formed by bearing rings of a roller bearing.

FIG. 2 shows the seal 1 from FIG. 1 installed in a sealing arrangement. A detail from the sealing arrangement is shown. In said exemplary embodiment of the sealing arrangement, the two machine elements 27, 28 are formed by the outer ring and the inner ring of a roller bearing, the seal 1 being arranged with its peg arms 8, 9 in a positive-locking manner in the installation groove 29 of the machine element 27 which is realized as an outer ring. The peg arms 8, 9 are arranged in a statically sealing manner in the installation groove 29. The sealing lips 10, 11 contact the surface to be sealed of the machine element 28, which is adjacent radially on the inside, in a dynamically sealing manner.

Figure 3:
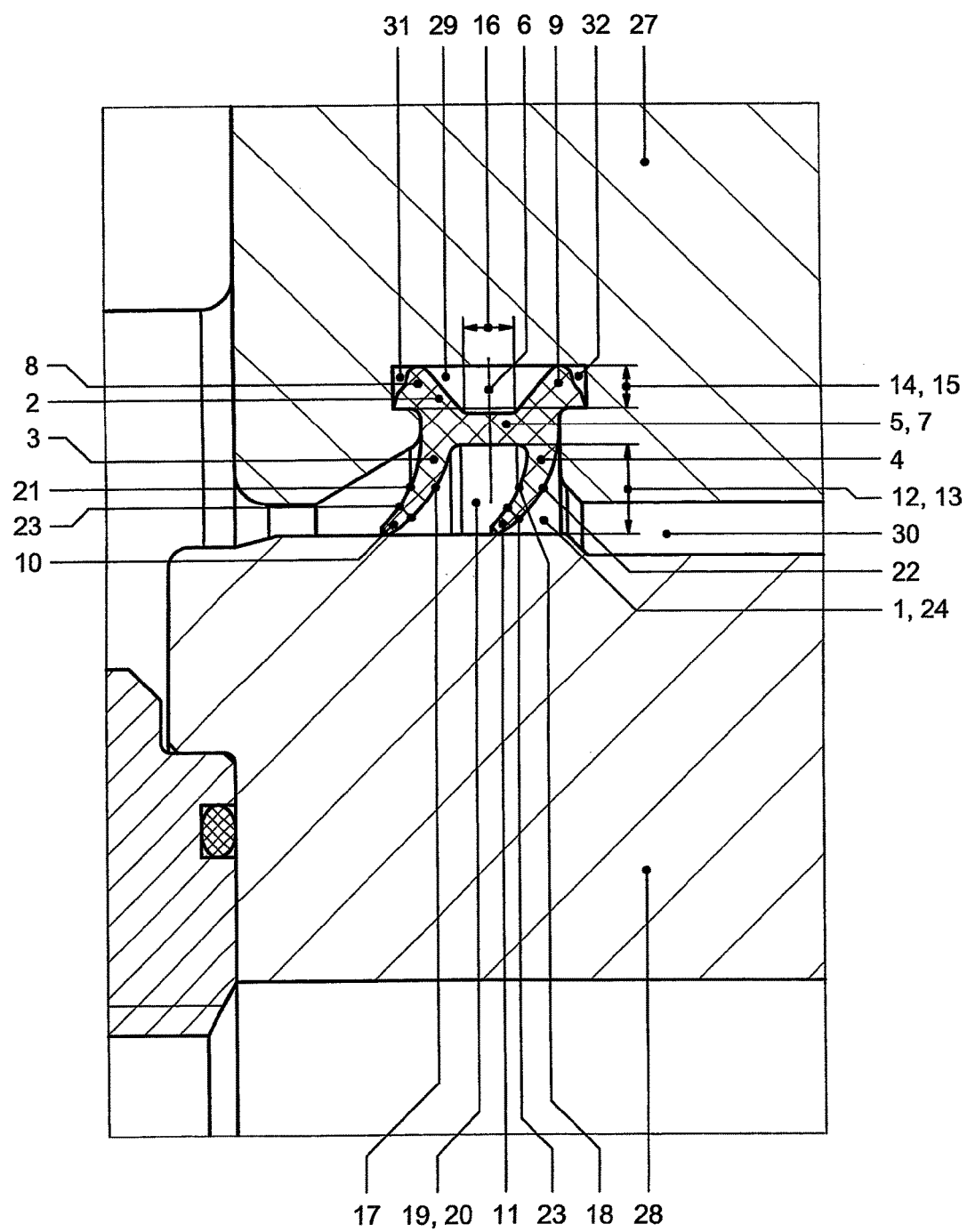
FIG. 3 shows an enlarged representation of a seal, installed in a sealing arrangement.

FIG. 3 shows an enlarged representation of a seal 1. The installation groove 29 is provided with an undercut for receiving the peg arms 8, 9, the peg arms 8, 9 being arranged in a statically sealing manner in the installation groove 29.

In the axial direction, the sealing lips 10, 11 delimit a lubricant reservoir 20 which is filled with a lubricant 19, for example a barrier grease. The flanks 17, 18, 21, 22 of the sealing lips 10, 11 have in each case a surface profiling 23 which ensures that, together with a lubricant 19 arranged in the surface profiling 23, the friction between the sealing lips 10, 11 and the machine element 28 as well as the abrasive wear of the sealing lips 10, 11 are reduced.

The previously described seal 1 is produced as a result of an endless belt-shaped sealing profile 2 being extruded in a first method step and the extruded sealing profile 2 being cut to length in a second method step. In the third method step, the cut-to-length sealing profile 2 is deformed in a ring-shaped manner, and the free ends 25, 26 are joined together as a result of a welding operation.

The mounting of the seal 1 into the installation groove 29 of a machine element 27 is shown in FIGS. 4 to 7 and is described in more detail below.

Figure 4:
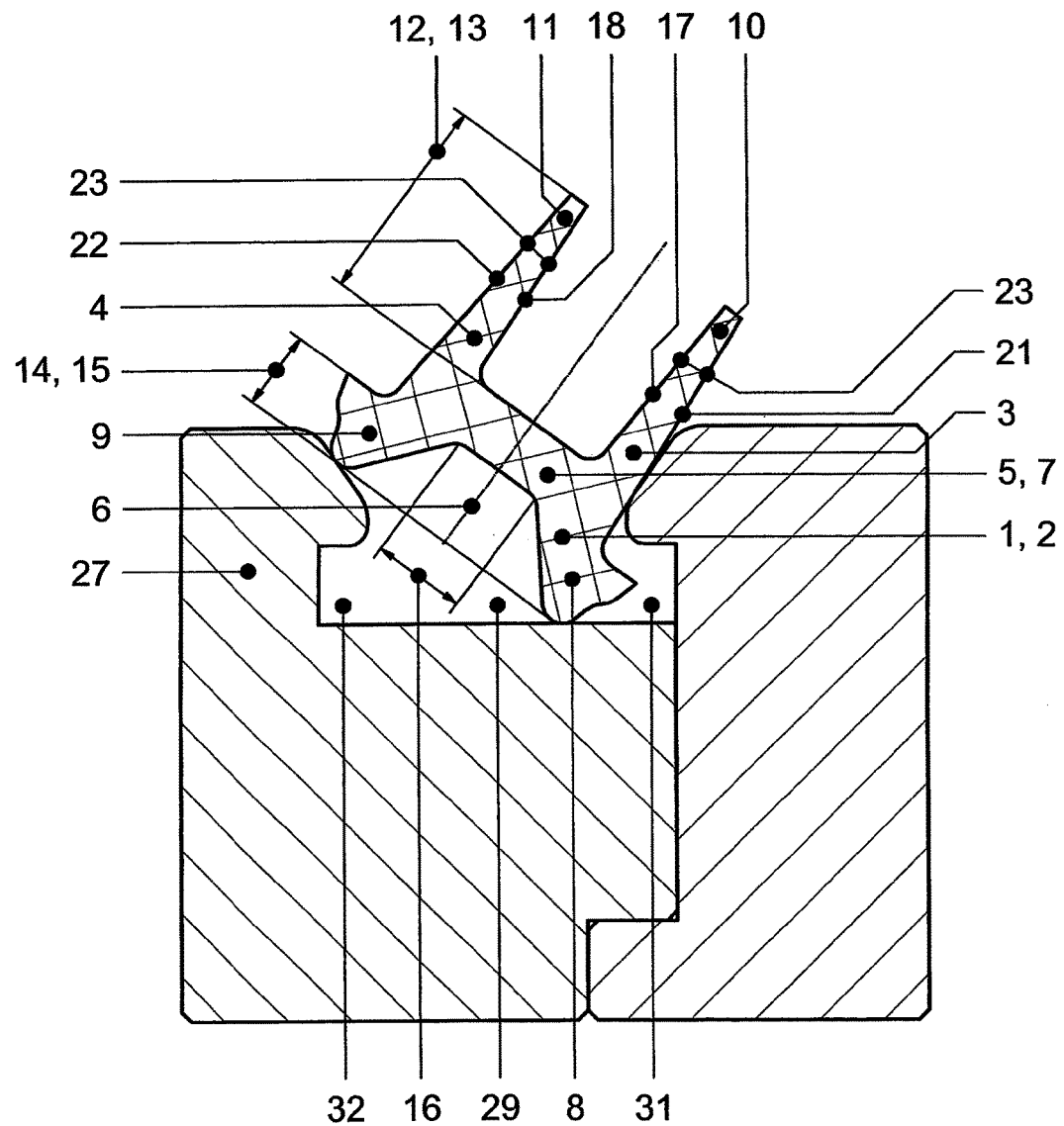
FIG. 4 to FIG. 7 show the assembly of a seal according to the invention with its peg arms in the installation groove of a machine element.

The seal 1 is initially hooked by way of one of its peg arms 8, 9 into a first undercut 31 of the installation groove 29, as shown in FIG. 4. The other peg arm 9, 8 in this case abuts against the machine element 27 which delimits the installation groove 29. The seal 1 is shown in its production-related state in FIG. 4.

Figure 5:
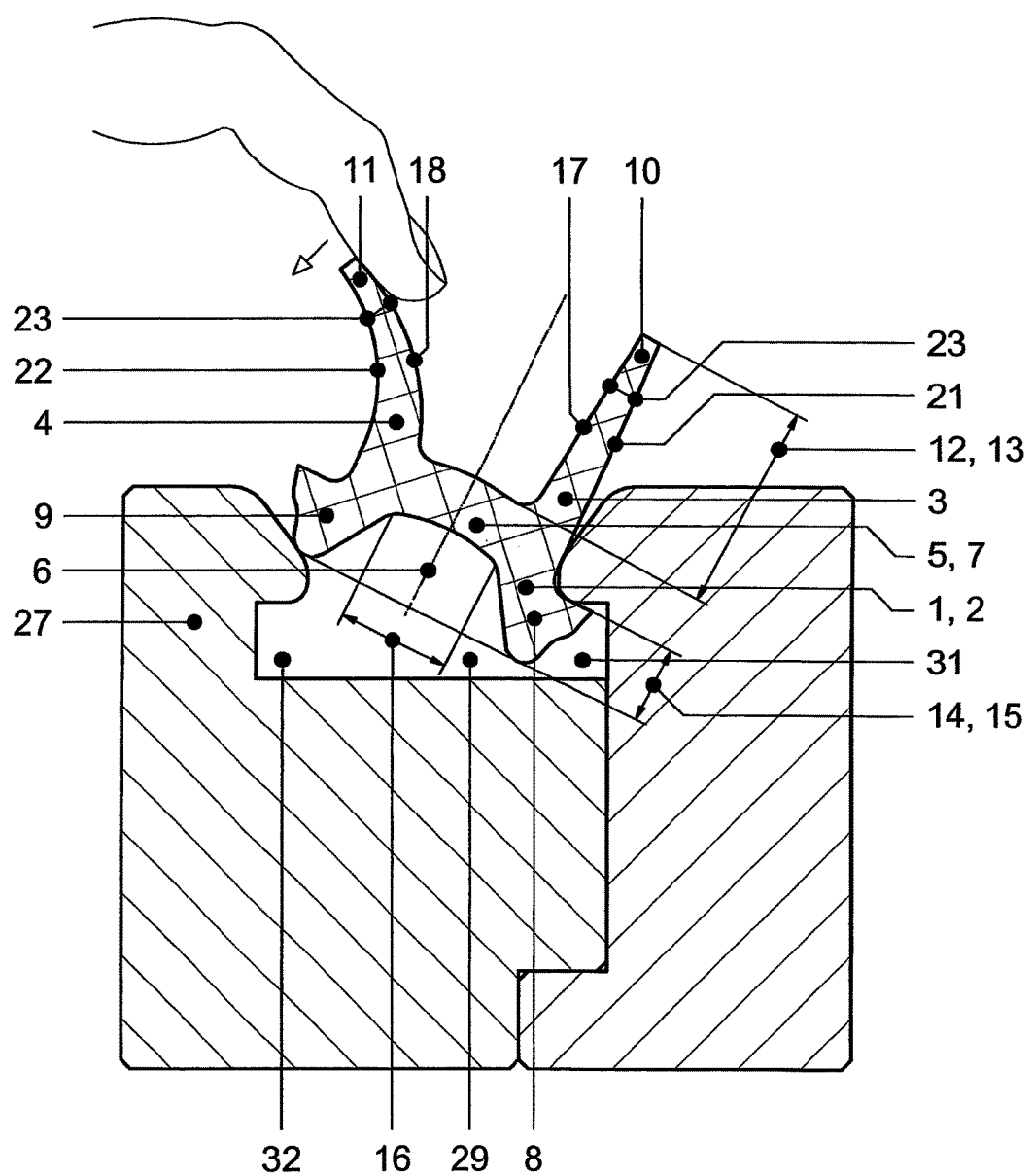

In FIG. 5, the sealing lip 11, 10, which is located diagonally opposite the already hooked-in peg arm 8, 9, is moved by the fitter away from the adjacent sealing lip 10, 11 about the cross web 5 which is realized as a pivot joint 7, the peg arm 9, 8 being pivoted in the direction of the adjacent peg arm 8, 9 as a result.

Figure 6:
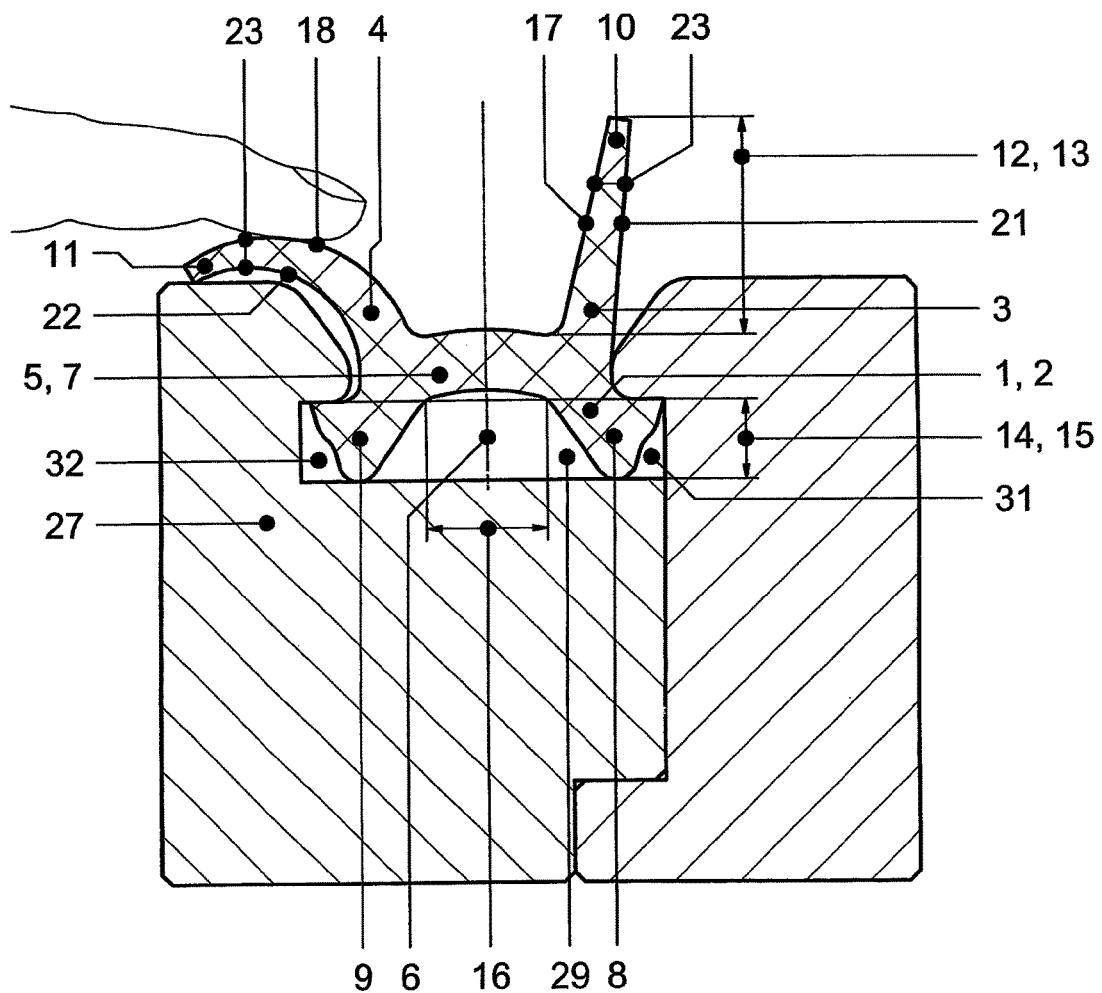

In FIG. 6 the peg arm 9 is snapped into the second undercut 32 of the installation groove 29 and as a result is held in a positive locking manner in the installation groove 29. If the sealing lip 11 is then released by the fitter, it moves in an elastic manner back again into the production-related form.

Figure 7:
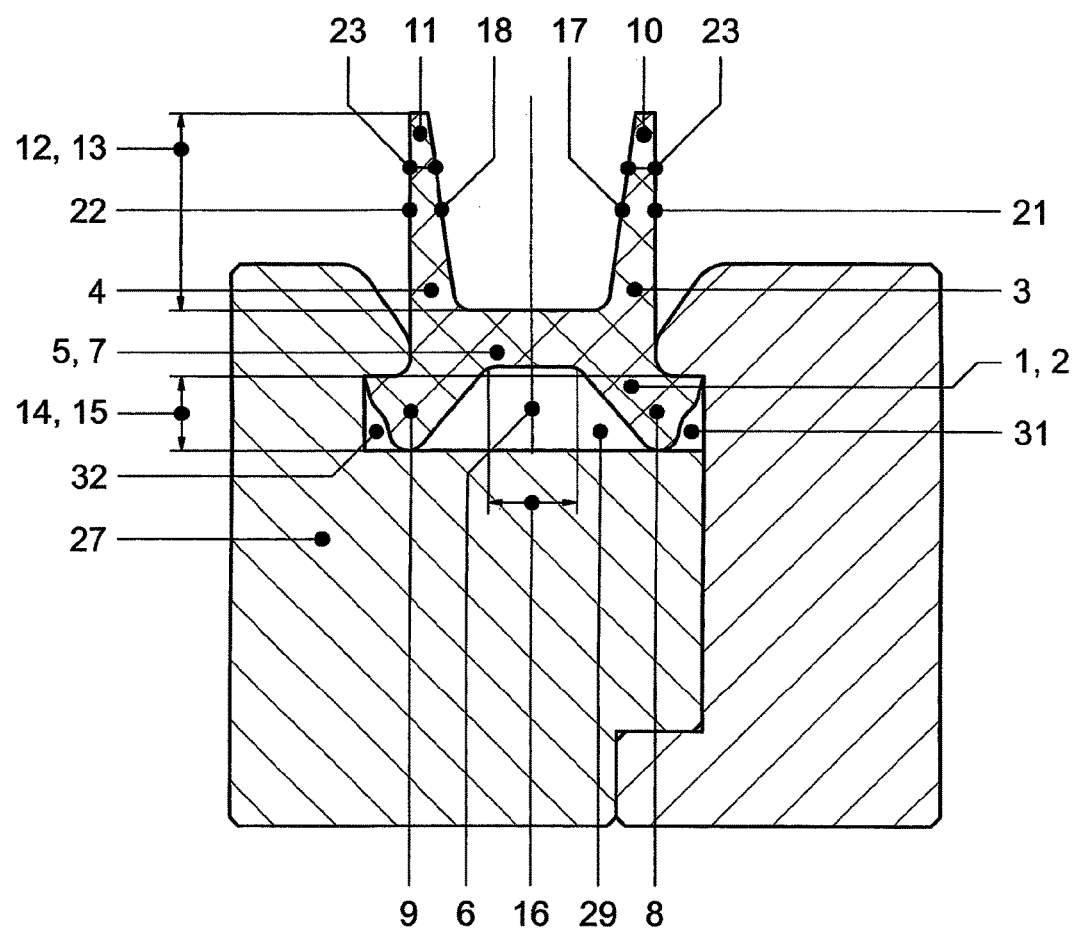

FIG. 7 shows the seal 1 installed into the installation groove 29.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A seal for engaging an installation groove of a first machine element, the seal comprising:
   a substantially H-shaped sealing profile, wherein the sealing profile includes two longitudinal webs arranged vertically and spaced apart from one another with a horizontal cross web connecting the two longitudinal webs, the cross web being deformable so as to enable pivoting of the longitudinal webs relative to one another,
   wherein each longitudinal web includes a sealing lip on a bottom end and peg arm on a top end,
   wherein each peg arm extends horizontally outward from the respective longitudinal web,
   wherein the peg arms are pivotable toward one another when the cross web is deformed to enable insertion of the peg arms into the installation groove, and
   wherein a greatest width of the seal is at the horizontally extending peg arms, the greatest width being greater than a smallest width of the installation groove.

2. The seal of claim 1, wherein the sealing profile is symmetric with respect to a first imaginary plane that vertically bisects the cross web, and
   wherein the sealing profile is asymmetric with respect to a second imaginary plane arranged orthogonally to the first imaginary plane and intersecting the first imaginary plane in the cross web.

3. The seal of claim 1, wherein a ratio between a length of the sealing lips and a length of corresponding peg arms of the respective longitudinal webs is at least 2.

4. The seal of claim 1, wherein the peg arms are in the shape of a latching lug.

5. The seal of claim 1, wherein a ratio between a length of the peg arms and a flexibly effective width of the cross web is in a range of from 0.75 to 1.5.

6. The seal of claim 1, wherein the sealing lips include flanks that face one another such that the sealing lips delimit a lubricant reservoir, which is filled with a lubricant.

7. The seal of claim 6, wherein the sealing lips include flanks that are remote from one another, and at least one of the flanks facing one another, the flanks remote from one another, or both, include a surface profiling.

8. The seal of claim 1, wherein the seal comprises an elastic material with a Shore hardness A of between 70 and 95.

9. The seal of claim 1, wherein the seal comprises a polyurethane.

10. The seal of claim 8, wherein the elastic material includes a friction-reducing filler.

11. The seal of claim 1, in the form of a sealing ring.

12. A method for producing the seal of claim 1, the method comprising:
    extruding an endless belt-shaped sealing profile;
    cutting the endless belt-shaped sealing profile to length, to obtain a cut-to-length sealing profile;
    deforming the cut-to-length sealing profile in a ring-shaped manner, leaving two free ends; and
    connecting together the two free ends of the sealing profile, which is formed into the sealing ring.

13. The method of claim 12, wherein the sealing profile is formed into a sealing ring with a diameter≥400 mm in the deforming.

14. The method of claim 12, wherein the connecting includes welding the two free ends.

15. The method of claim 14, wherein the free ends are joined as a result of mirror welding.

16. A sealing arrangement, comprising:
    the seal of claim 1;
    the first machine element; and
    a second machine element,
    wherein the seal is arranged with its peg arms each in a positive locking manner in the installation groove of the first machine element, wherein the seal contacts the installation groove with its peg arms in a substantially statically sealing manner, and
    wherein the seal contacts the second machine element with sealing lips in a dynamically sealing manner.

17. The sealing arrangement of claim 16, wherein the first machine element comprises a housing with a bore,
    wherein the second machine element comprises a shaft that is surrounded by the housing at a radial spacing, and
    wherein the seal, which surrounds the shaft with its sealing lips in a dynamically sealing manner, is arranged in a gap formed by a spacing.

* * * * *